United States Patent
Danielsen

(10) Patent No.: US 8,284,916 B2
(45) Date of Patent: Oct. 9, 2012

(54) CONFERENCE-CALL PARTICIPANT-INFORMATION PROCESSING

(75) Inventor: Peter J. Danielsen, Naperville, IL (US)

(73) Assignee: Alcatel Lucent, Paris (FR)

( * ) Notice: Subject to any disclaimer, the term of this patent is extended or adjusted under 35 U.S.C. 154(b) by 940 days.

(21) Appl. No.: 12/353,542

(22) Filed: Jan. 14, 2009

(65) Prior Publication Data

US 2010/0177880 A1 Jul. 15, 2010

(51) Int. Cl.
*H04M 7/00* (2006.01)
(52) U.S. Cl. .................................. 379/202.01; 370/261
(58) Field of Classification Search ............. 379/202.01; 370/261
See application file for complete search history.

(56) References Cited

U.S. PATENT DOCUMENTS

| | | | |
|---|---|---|---|
| 5,450,481 A | 9/1995 | Penzias | |
| 6,577,622 B1 | 6/2003 | Schuster et al. | |
| 6,857,021 B1 | 2/2005 | Sidhu et al. | |
| 6,882,971 B2 | 4/2005 | Craner | |
| 6,959,074 B2 | 10/2005 | Berstis | |
| 7,266,189 B1 | 9/2007 | Day | |
| 7,305,078 B2 | 12/2007 | Kardos | |
| 7,343,008 B1 | 3/2008 | Frankel | |
| 2002/0064164 A1 | 5/2002 | Barany et al. | |
| 2003/0112947 A1 | 6/2003 | Cohen | |
| 2003/0145054 A1* | 7/2003 | Dyke | 709/205 |
| 2007/0004400 A1 | 1/2007 | McClung | |
| 2007/0106724 A1 | 5/2007 | Gorti et al. | |
| 2007/0115919 A1 | 5/2007 | Chahal et al. | |
| 2007/0274298 A1 | 11/2007 | Strandberg et al. | |
| 2008/0095079 A1 | 4/2008 | Barkley et al. | |
| 2008/0181140 A1 | 7/2008 | Bangor et al. | |
| 2008/0187143 A1* | 8/2008 | Mak-Fan | 381/17 |
| 2009/0150151 A1* | 6/2009 | Sakuraba et al. | 704/246 |
| 2011/0311073 A1* | 12/2011 | Loether | 381/80 |

OTHER PUBLICATIONS

Rosenberg, et al., SIP: Session Initiation Protocol (RFC 3261), www.ietf.org, 2002 [retrieved on Feb. 11, 2008] Retrieved from the Internet: <URL: http://www.ietf.org/rfc/r1c3261.txt> pp. 1-269.
Roach, Session Initiation Protocol (SIP)-Specific Event Notification (RFC 3265), www.ietf.org, 2002 [retrieved on Dec. 17, 2008] Retrieved from the Internet: <URL: http://www.ietf.org/rfc/rfc3265.txt> pp. 1-38.

(Continued)

*Primary Examiner* — Quynh Nguyen
(74) *Attorney, Agent, or Firm* — Mendelsohn, Drucker & Associates, P.C.; Edward Meisarosh; Steve Mendelsohn

(57) ABSTRACT

In one embodiment, a telecommunication device for Internet-based conference calling with one or more similar telecommunication devices. The telecommunication device is used by a plurality of co-located participants, each participant having an individually identifiable microphone. The telecommunication device accesses a database correlating each individually identifiable microphone to participant ID and information. During the conference-call setup, the similar telecommunication devices exchange participant IDs and corresponding information. The conference-call audio content is then exchanged using RTP packets, where the telecommunication devices generate RTP packets containing the participant IDs of participants contributing to the content of each RTP packet. Receiving telecommunication devices then display corresponding participant information when playing the audio content of received RTP packets to identify current speakers. Individual, identifiable microphones improve the audio quality received by remote participants and permit the automatic exchange and display of the current participants and the current speakers.

20 Claims, 4 Drawing Sheets

OTHER PUBLICATIONS

Schulzrinne, et al., RTP: A Transport Protocol for Real-Time Applications (RFC 3550), www.ietf.org, 2003 [retrieved on Dec. 1, 2008] Retrieved from the Internet: <URL: http://www.ietf.org/rfc/rfc3550.txt> pp. 1-104.

Rosenberg, et. al., A Session Initiation Protocol (SIP) Event Package for Conference State (RFC 4575), www.ietf. org, 2006 [retrieved on Dec. 29, 2008] Retrieved from the Internet: <URL: http://www.ietf.org/rfc/rfc4575.txt> pp. 1-39.

Johnston & Levin, Session Initiation Protocol (SIP) Call Control—Conferencing for User Agents (RFC 4579), www.ietf.org, 2006 [retrieved on Dec. 1, 2008] Retrieved from the Internet: <URL: http://www.ietf.org/rfc/rfc4579.txt> pp. 1-43.

\* cited by examiner

FIG. 3
300

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| V=2 | | P | X | CC | | | | M | | PT | | | | | | | SEQUENCE NUMBER | | | | | | | | | | | | | | |
| TIMESTAMP | | | | | | | | | | | | | | | | | | | | | | | | | | | | | | | |
| SYNCHRONIZATION SOURCE (SSRC) IDENTIFIER ~ 301 | | | | | | | | | | | | | | | | | | | | | | | | | | | | | | | |
| CONTRIBUTING SOURCE (CSRC) IDENTIFIERS ..... ~ 302 | | | | | | | | | | | | | | | | | | | | | | | | | | | | | | | |

CONFERENCE-CALL PARTICIPANT-INFORMATION PROCESSING

BACKGROUND OF THE INVENTION

1. Field of the Invention

The current invention relates to conference-call systems, and in particular, to improving the user experience for conference-call participants.

2. Description of the Related Art

A conference call provides an economical way for participants in multiple locations to participate in a meeting and be able to discuss topics of interest without requiring all the participants to be physically located in the same place for the meeting. In a typical conference call, some participants are located together in one location, i.e., co-located, while other participants at other locations are either alone or also in groups. In some conference calls, every participant is alone. As used herein and unless otherwise indicated, a conference call refers to a telephonic call with at least three total participants and at least two conferencing nodes. A conferencing node, as used herein and unless otherwise indicated, refers to a conference-call location with one telecommunication device and at least one participant. The simplest conference call, thus, involves two conferencing nodes, where one node hosts one participant and the other node hosts two participants. More-complex conference calls include more participants, more conferencing nodes, or more of both.

A conference-call system generally efficiently transmits the voices of participants. However, there is other potentially useful information that is not typically transmitted by a conference-call system. For example, simple conference-call systems provide no indication of who is speaking at any particular time. Thus, other participants at remote locations might be unable to determine who is talking, which makes analysis of and response to the talker's statements more difficult than if all participants were in the same location and could see who is talking.

U.S. Pat. No. 5,450,481 to Penzias, for example, incorporated herein by reference in its entirety, describes a method and apparatus for tracking conference-call participants using conference-tracker apparatuses at the various locations, which (i) are provided with identifying information and (ii) communicate with each other via audio pulses. U.S. Pat. No. 7,266,189 to Day, for example, incorporated herein by reference in its entirety, describes an apparatus and method for identifying stationary conference-call participants by their spatial position with respect to a station of the conference-call system.

U.S. Pat. No. 7,305,078 to Kardos, incorporated herein by reference in its entirety, describes systems and methods for identifying speakers in a conference call using a voice-recognition module that compares the voice of a current speaker to stored voiceprints associated with identifying information. Other conference-call participants are then sent the identifying information. U.S. Pat. App. Pub. No. 2007/0106724 to Gorti et al., incorporated herein by reference in its entirety, describes a system and method for conference calls where participants are identified by their login information and where a module monitors who is speaking.

The prior-art methods may require more processing than is needed to accomplish the goal of identifying speakers in a conference call. In addition, they do not provide some features that users may find useful.

SUMMARY OF THE INVENTION

One embodiment of the invention can be a telecommunication device comprising a networking port, two or more microphone ports, and a processor. The networking port is adapted to connect the telecommunication device with one or more other telecommunication devices to establish a conference call including the telecommunication device and the one or more other telecommunication devices. The two or more microphone ports are adapted to connect the telecommunication device with two or more microphones, wherein each microphone (1) is co-located with the telecommunication device, (2) is individually identifiable by the telecommunication device, (3) is associated with an identifiable participant co-located with the microphone, and (4) is adapted to transmit audio content generated by the associated participant to the telecommunication device. The processor is adapted to (1) generate data packets encoding the audio content generated by the participants associated with the two or more microphones, wherein each data packet identifies at least one participant contributing to the audio content encoded in the data packet, and (2) transmit the data packets via the networking port for the conference call.

Another embodiment of the invention can be a method for a telecommunication device, the method comprises connecting the telecommunication device with one or more other telecommunication devices to establish a conference call including the telecommunication device and the one or more other telecommunication devices. The method further comprises connecting the telecommunication device with two or more microphones, wherein each microphone (1) is co-located with the telecommunication device, (2) is individually identifiable by the telecommunication device, (3) is associated with an identifiable participant, and (4) is adapted to transmit audio content generated by the associated participant to the telecommunication device. The method further comprises generating data packets encoding the audio content generated by the participants associated with the two or more microphones, wherein each data packet identifies at least one participant contributing to the audio content encoded in the data packet. The method further comprises transmitting the data packets for the conference call.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3 shows the structure of the header of a typical RTP packet.

DETAILED DESCRIPTION

Figure 1:
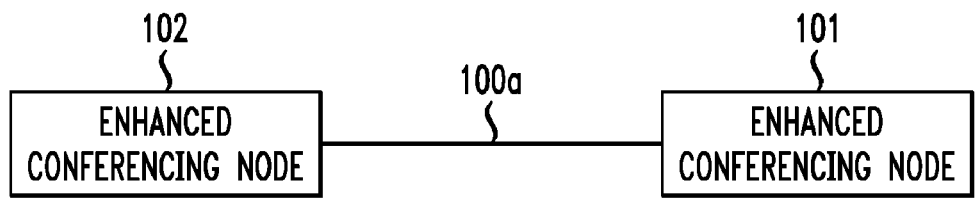
FIG. 1 shows a simplified block diagram of a conference-call system in accordance with one embodiment of the present invention.

FIG. 1 shows a simplified block diagram of conference-call system 100 in accordance with one embodiment of the present invention. Conference-call system 100 comprises conferencing nodes 101 and 102 connected via path 100a. Conferencing nodes 101 and 102 are enhanced conferencing nodes, which provide features useful for a plurality of co-located conference-call participants sharing a telecommunication device.

A conference call including conferencing nodes 101 and 102 may be set up using the Session Initiation Protocol (SIP). SIP is a widely used call-signaling protocol for controlling (e.g., establishing, modifying, and terminating) packet-switched-network-based, application-layer, multimedia, logical connections between or among hosts, such as conferencing nodes 101 and 102. It should be noted that a commonly used packet-switched network is the Internet. The SIP-host logical entities that form end-points of the logical connections and generate and receive SIP messages are known as user agents (UAs). The current basic SIP structure is described in RFC (request for comments) 3261, titled "SIP: Session Initiation Protocol," incorporated herein by reference in its entirety (available online at http://www.ietf.org/rfc/rfc3261.txt).

Parameters of the SIP-established logical connection, also known as a session, can be placed in the header or the payload segment of a SIP message. Payload parameters may be encoded in any of a variety of formats, such as extended markup language (XML), Session Description Protocol (SDP), and/or any other suitable protocol. Examples of encoded parameter information include the IP address and UDP (user datagram protocol) port number to be used by the application traffic, which is called bearer traffic. Bearer traffic for conference calls is transmitted using Real-time Transport Protocol (RTP) packets. RTP is described in RFC 3550, titled "RTP: A Transport Protocol for Real-Time Applications," incorporated herein by reference in its entirety (available online at http://www.ietf.org/rfc/rfc3550.txt).

SIP provides extensive capabilities as well as flexibility in session control. For example, SIP messages can include information additional to that provided by standard SIP-message headers and payloads. SIP is a flexible protocol which allows for custom extensions to accommodate different situations. SIP messages may contain multiple sections, also known as "body parts," where, using a "handling" parameter, some sections may be defined as required and other sections may be defined as optional. If a SIP UA receives a SIP message with an optional section that the SIP UA does not understand, then the SIP UA ignores that optional section and processes the SIP message as if it did not contain that optional section. However, if a SIP UA receives a SIP message with a required section that the SIP UA does not understand, then the SIP UA should reject the message and respond with a suitable error code.

Conference-call-specific parameters can be transmitted using the infrastructure described in RFC 3265, titled "Session Initiation Protocol (SIP)-Specific Event Notification," incorporated herein by reference in its entirety (available online at http://www.ietf.org/rfc/rfc3265.txt), which provides an extension to the basic SIP protocol. A SIP event package for certain conferences is described in RFC 4575, titled "A Session Initiation Protocol (SIP) Event Package for Conference State," incorporated herein by reference in its entirety (available online at http://www.ietf.org/rfc/rfc4575.txt).

A conference call involving only conferencing nodes 101 and 102 can be established in a way similar to establishing a simple peer-to-peer SIP call. Additional conferencing nodes (not shown) can also be added using various SIP methodologies, as would be appreciated by one of ordinary skill in the art. Assume, for example, that conferencing nodes 101 and 102 start with two participants each (not shown), where the initial participants at conferencing node 101 are designated 101-1 and 101-2, while the participants at conferencing node 102 are designated 102-1 and 102-2.

Figure 2:
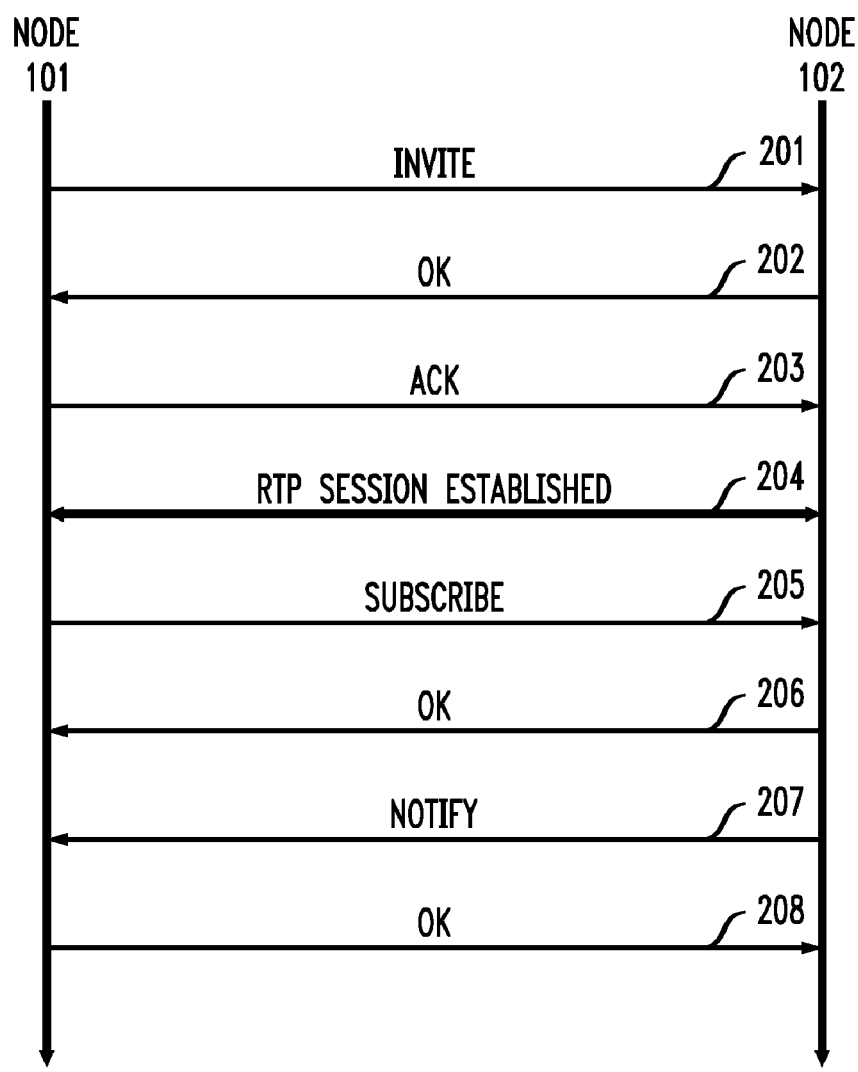
FIG. 2 shows an exemplary message-flow diagram for the establishment of a conference call involving conferencing nodes of FIG. 1.

FIG. 2 shows an exemplary message-flow diagram for the establishment of a conference call involving conferencing nodes 101 and 102 of FIG. 1, where the vertical arrows indicate a message timeline. Conferencing node 101 initiates the conference call by sending SIP INVITE message 201 to conferencing node 102, where SIP INVITE message 201 includes a "conference" field value in an "Allow-Events" field (e.g., "Allow-Events: conference") of the header. It should be noted that the presence of the "Allow-Events" field indicates that the sending UA supports SIP NOTIFY and SUBSCRIBE messages, which are described in the above-referenced RFC 3265.

Conferencing node 102 responds to SIP INVITE message 201 with SIP OK response (also known as a "200" response since it is a SIP response whose status code is 200; the reason phrase of the response is "OK") 202, which includes a "conference" field value in an "Allow-Events" field of the OK response. Conferencing node 101 acknowledges OK response 202 with SIP ACK response 203. After conferencing node 102 receives SIP ACK response 203, RTP session 204 is established between the two conferencing nodes so that multimedia content, such as audio, can flow between the two conferencing nodes using RTP packets.

Conferencing node 101 subscribes to the conference events at conferencing node 102 by sending to conferencing node 102 SIP SUBSCRIBE message 205 with a "conference" field value in an "Event" field. Conferencing node 102 responds with OK response 206 and SIP NOTIFY message 207 having a "conference" field value in an "Event" field in the header and an identification of and information about participants 102-1 and 102-2 in the payload of SIP NOTIFY message 207. The participant identification and information may be encoded, for example, in XML format. Conferencing node 101 then responds with OK response 208. Conferencing node 102 subscribes to the conference events at conferencing node 101 by a corresponding interaction (not shown) where it receives an identification of and information about participants 101-1 and 101-2. It should be noted that the SIP messages of the subscription of conferencing node 102 may be transmitted before, interspersed with, and/or after messages 205-208 are transmitted. The identification and information include, e.g., a participant ID, name, and title for each participant. Thereby, multiple enhanced conferencing nodes exchange participant identification and information for use in conjunction with participation identification in RTP packets exchanged during the conference call.

FIG. 3 shows the structure of the header 300 of a typical RTP packet. RTP header 300 includes synchronization source (SSRC) identifier 301 and optional contributing source (CSRC) identifiers field 302. The RTP standard provides CSRC field 302 so that multimedia mixers, which combine multimedia contents from multiple synchronization sources, can insert the SSRC identifiers of the multiple contributing synchronization sources in the CSRC field of corresponding RTP packets output by the mixer. The standard CSRC field can include up to fifteen 32-bit SSRC identifiers. The SSRC identifier of RTP packets output by the mixer identify the mixer itself. Conference-call system 100, however, uses CSRC field 302 differently, as described below.

Conferencing nodes 101 and 102 use CSRC field 302 of RTP header 300 to identify speaking participants. Conferencing node 101 has a corresponding standard SSRC identifier that is inserted in the SSRC identifier field of RTP packets output by conferencing node 101. Participants 101-1 and 101-2, however, do not have corresponding standard SSRC identifiers. The participant IDs of participants 101-1 and 101-2 are determined by system 100 and are not standard SSRC identifiers since the participants are not synchronization sources and do not themselves generate any RTP packets.

When participant 101-1 generates multimedia content (e.g., by speaking), conferencing node 101 inserts the participant ID associated with participant 101-1 in the CSRC field of corresponding RTP packets. Similarly, when participant 101-2 generates multimedia content, conferencing node 101 inserts the participant ID associated with participant 101-2 in the CSRC field of corresponding RTP packets. If participants 101-1 and 101-2 generate multimedia content substantially simultaneously, e.g., by speaking substantially simultaneously, then conferencing node 101 inserts the participant IDs associated with both participants 101-1 and 101-2 in the CSRC field of corresponding RTP packets. It should be noted that conferencing node 101 can employ a signal time and/or amplitude threshold for adding a participant ID to an RTP packet in order to prevent certain brief and/or aberrant non-speech sounds from making it appear as though the source participant is speaking. Conferencing node 102 operates in a similar manner in relation to participants 102-1 and 102-2. Conferencing nodes 101 and 102 can then use the information about a participant transmitted via the above-described SIP transport mechanism together with the participant IDs appearing in received RTP packets to display information about the participants currently speaking at the remote location, e.g., conferencing node 102, to participants at the local node, e.g., conferencing node 101. A participant is deemed currently speaking if, for example, the participant contributed to the multimedia content in the RTP packet being decoded.

Conference-call system 100 also provides updates if a conferencing node determines either that a new participant has joined the conference call at the conferencing node or that a previous participant has left the conference call at the conferencing node. If, for example, during an ongoing conference call, conferencing node 101 determines that participant 101-1 has left the conference call at conferencing node 101, then conferencing node 101 sends a SIP NOTIFY message to conferencing node 102 indicating that participant 101-1 has left the conference. The SIP NOTIFY message may (a) list all the participants currently present at conferencing node 101, now that participant 101-1 has left or (b) provide the participant ID of participant 101-1 with an indicator that participant 101-1 has left conferencing node 101. The second method may be preferable particularly where there are many participants at a conferencing node with many participants joining or leaving the conferencing node. Conferencing node 102 responds with a SIP OK message indicating receipt and processing of the SIP NOTIFY message.

Similarly, if, for example, during an ongoing conference call, conferencing node 102 determines that new participant 102-3 has joined the conference call at conferencing node 102, then conferencing node 102 sends a SIP NOTIFY message to conferencing node 101 indicating that new participant 102-3 has joined the conference. Conferencing node 101 responds with a SIP OK message indicating receipt and processing of the SIP NOTIFY message.

Figure 4A:
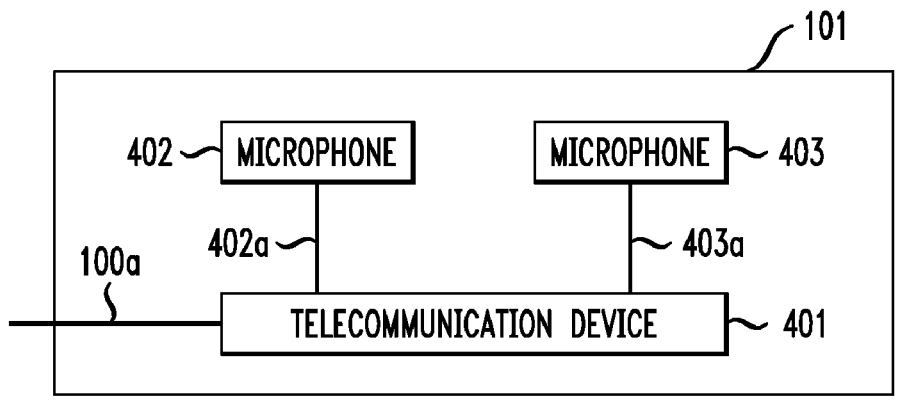
FIGS. 4A and 4B show simplified block diagrams of exemplary implementations of a conferencing node of FIG. 1.

FIG. 4A shows a block diagram of an exemplary implementation of conferencing node 101 of FIG. 1. Conferencing node 101 allows for improved audio quality on a conference call by having individual microphones for individual participants, instead of the conventional shared microphones for multiple participants. Conferencing node 101 comprises telecommunication device 401 and microphones 402 and 403. Telecommunication device 401 is connected via path 100a to conferencing node 102 and may be connected to additional conferencing nodes (not shown), as well. Microphones 402 and 403 are co-located with and connected to telecommunication device 401 via paths 402a and 403a, respectively. Paths 402a and 403a may be wired or wireless. Telecommunication device 401 includes a speaker (not shown) to play the audio from the remote conferencing nodes.

In one exemplary implementation of conferencing node 101 of FIG. 4A, microphones 402 and 403 are wireless BLUETOOTH® microphones, and telecommunication device 401 includes a BLUETOOTH® transceiver (BLUETOOTH® is a registered trademark of the BLUETOOTH® Special Interests Group (SIG)). Microphones 402 and 403 may be the microphones of BLUETOOTH® headsets or dedicated BLUETOOTH® microphones. Each BLUETOOTH® device is uniquely associated with a BLUETOOTH® ID which can be uniquely associated with a participant ID. Thus, in one implementation, it is assumed that microphone 402 belongs to participant 101-1, that microphone 403 belongs to participant 101-2, and that telecommunication device 401 can access an information store (not shown), such as a database, correlating BLUETOOTH® IDs of microphones with corresponding participant IDs and corresponding participant information (e.g., name and title). In another implementation, unique participant IDs are generated dynamically during the conference call for each BLUETOOTH® microphone used. Other associations for participant IDs are also possible within the scope of the invention.

After connection 402a is established, telecommunication device 401 determines the participant ID associated with microphone 402. If a conference call is established or is ongoing, then telecommunication device 401 includes the participant ID and associated participant information (e.g., name and title) in an appropriate SIP NOTIFY message to the other conferencing nodes. When telecommunication device 401 generates an RTP packet with content from microphone 402, the associated participant ID is included in the CSRC field of that RTP packet. Similar processing occurs for microphone 403.

After both connections 402a and 403a are established, telecommunication device 401 mixes audio from microphones 402 and 403, i.e., audio content from participants 101-1 and 101-2, respectively, to generate RTP packets, as described above. If only one participant is speaking at a time, then the corresponding RTP packets should only identify that participant in their CSRC fields, while if both participants are speaking at a time, then the corresponding RTP packets should identify both participants in their CSRC fields. The SSRC fields of all RTP packets generated by telecommunication device 401 should identify telecommunication device 401 as the synchronization source.

Figure 4B:
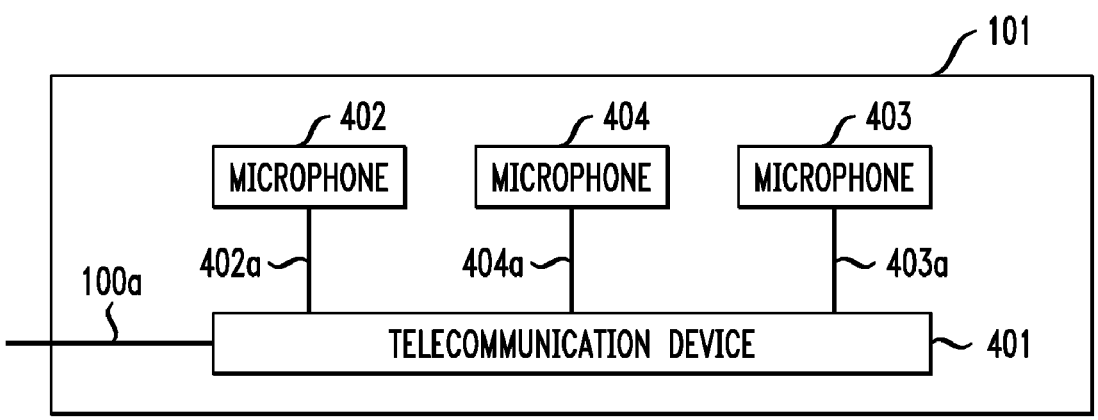

FIG. 4B shows conferencing node 101 of FIG. 4A, but where microphone 404 is also within conferencing node 101 and connected to telecommunication device 401 via path 404a. This can happen if, for example, microphone 404 is a BLUETOOTH® microphone that comes within communication range of the BLUETOOTH® transceiver of telecommunication device 401 and is automatically detected by and connected to telecommunication device 401. Assume microphone 404 belongs to participant 101-3. When path 404a is established during an ongoing conference call, telecommunication device 401 determines a corresponding participant ID for microphone 404, determines the corresponding participant information (e.g., name and title) for participant 101-3, and sends a SIP NOTIFY message containing that participant ID and information to the other conferencing nodes. Any subsequent RTP packets with contents from microphone 404 include the corresponding participant ID in the CSRC field. This automatic proximity-based registration of a new participant, as well as corresponding proximity-based de-registration of a departed participant, further enhance the user experience for conference-call participants by eliminating the need to interrupt the call to announce the arrival or departure of participants.

Telecommunication device 401 of conferencing node 101 of FIG. 4A includes a display (not shown) to show information received from the other conferencing nodes in a conference call. The display may be a screen showing the participant information (e.g., name and title) of remote participants being heard at conferencing node 101, based on information received by telecommunication device 401 in SIP messages and RTP packets from the other conferencing nodes. The display may be embodied as any human-readable device, including a screen that is part of telecommunication device 401 or a web page.

The display may also show the participant information of local participants (i.e., participants at conferencing node 101) speaking based on the above-described processing of telecommunication device 401. The display may instead list all the current remote participants based on received SIP messages and then indicate any that are presently speaking based on the received RTP packets. The indication may be with an icon, a light, highlighting, or any other suitable means. The display may also include the local participants and indicate their speaking status based on the above-described processing of telecommunication device 401. Conferencing node 102 of FIG. 1 operates in a similar way to conferencing node 101.

In one alternative implementation of conferencing node 101, telecommunication device 401 has wired connections to a plurality of microphones, where a microphone is individually identified by its connection port on telecommunication device 401 or through some means other than a BLUETOOTH® ID. When a participant joins the conference call at conferencing node 101, the microphone is dynamically associated with participant identification and information corresponding to the participant. The participant information may be input manually through an input device at conferencing node 101. Alternatively, the participant information may be retrieved automatically based on another identifier of the participant. For example, telecommunication device 401 may include a radio-frequency identification (RFID) reader (not shown) and participants may have RFID tags allowing participants to identify themselves to telecommunication device 401 using the RFID tag to activate a corresponding microphone. Telecommunication device 401 can access RFID-correlated information in an information store (not shown) such as, for example, the above-mentioned database that telecommunication device 401 can access.

In one alternative implementation of conferencing node 101, telecommunication device 401 includes an RFID reader and a plurality of releasable BLUETOOTH® microphones cradled by telecommunication device 401. A BLUETOOTH® microphone can be released and activated for use by having a participant proximately present a valid RFID tag (e.g., in an employee identification badge) to the RFID reader of telecommunication device 401. A dynamic association is then created between the BLUETOOTH® ID of the microphone and a participant ID and participant information corresponding to the participant. The conference call then proceeds as described above. The participant may then leave the conference by returning the BLUETOOTH® microphone to a cradle (not shown) of telecommunication device 401, which would also terminate the dynamic association of the BLUETOOTH® ID of the microphone to the participant ID and information of the participant.

Figure 5:
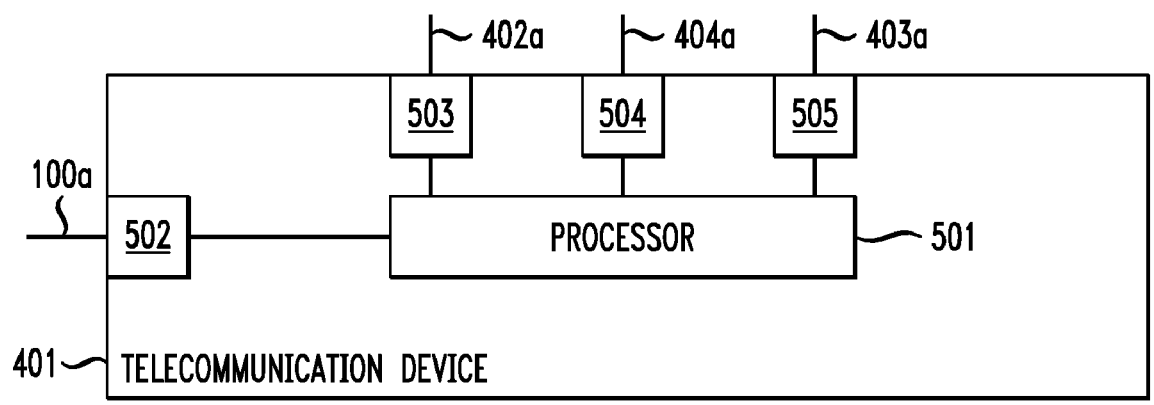
FIG. 5 shows a simplified block diagram of an exemplary implementation of the telecommunication device of FIG. 4B.

FIG. 5 shows a simplified block diagram of an exemplary implementation of telecommunication device 401 of FIG. 4B. Telecommunication device 401 comprises processor 501 and ports 502, 503, 504, and 505, which are connected to processor 501 and to paths 100*a*, 402*a*, 404*a*, and 403*a*, respectively. Port 502 is a networking port adapted to connect telecommunication device 401 with one or more other telecommunication devices to establish a conference call including telecommunication device 401 and the one or more other telecommunication devices. Ports 503, 504, and 505 are microphone ports adapted to connect the telecommunication device with the corresponding microphones 402, 404, and 403. Telecommunication device 401 may further comprise additional networking and/or microphone ports (not shown). It should be noted that the term "ports," as used herein and unless otherwise indicated, may refer to logical ports whose physical implementation is not limited to any particular form or structure. For example, several microphone ports may be physically implemented as a single BLUETOOTH® transceiver capable of identifying a microphone with which it is communicating. It should be noted that telecommunication device 401 may comprise a plurality of BLUETOOTH® transceivers. Furthermore, logical microphone ports may be established and/or dis-established dynamically. As another example, networking port 502 may be implemented as two separate physical ports, one for SIP traffic and the other for RTP traffic.

Processor 501 is adapted to generate and transmit data packets encoding audio content generated by the participants associated with the microphones corresponding to the microphone ports, wherein each data packet includes the participant ID of the corresponding participant. Processor 501 is also adapted to provide to the other telecommunication devices the participant IDs and information of the participants associated with the microphones of the conferencing node.

As noted above, more than two conferencing nodes may participate in a conference call. Additional nodes may be invited by nodes already in a conference call, new nodes may call a node already in the conference call to join the conference call, or a third party may be used to manage the conference call. One methodology for controlling a conference call using SIP is described in RFC 4579, titled "Session Initiation Protocol (SIP) Call Control—Conferencing for User Agents," incorporated herein by reference in its entirety (available online at http://www.ietf.org/rfc/rfc4579.txt). Alternative conference-call control mechanisms are also possible, as would be appreciated by one of ordinary skill in the art.

Figure 6:
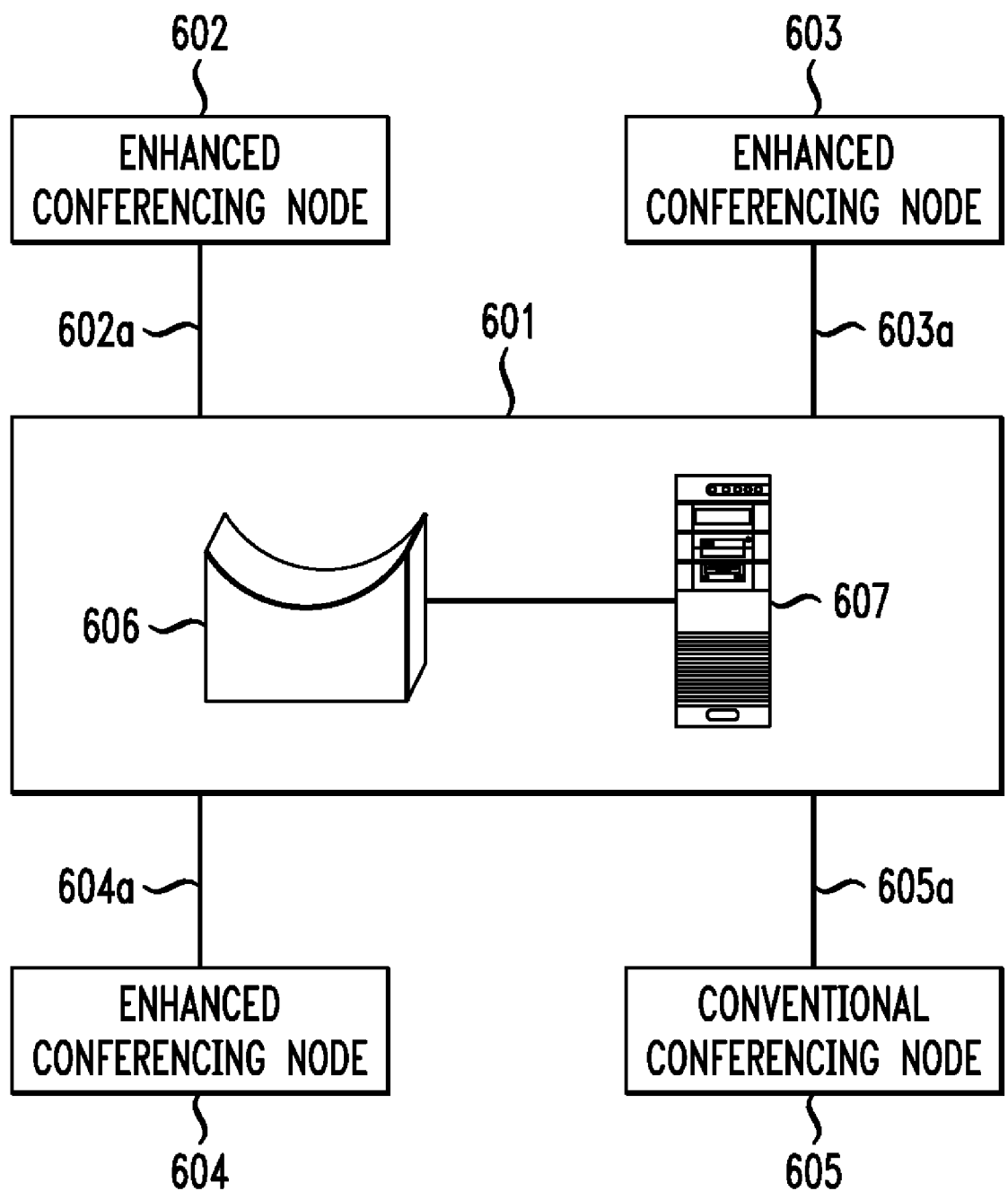
FIG. 6 shows a simplified block diagram of a conference-call system in accordance with another embodiment of the present invention.

FIG. 6 shows conference-call system 600 in accordance with another embodiment of the present invention. Conference-call system 600 comprises conference-call control (CCC) node 601 and conferencing nodes 602, 603, 604, and 605, each conferencing node connected to CCC node 601 via respective connections 602*a*, 603*a*, 604*a*, and 605*a*. It should be noted that each of these connections is not limited to a single pathway and may comprise multiple disparate physical pathways. CCC node 601 performs network bridging functions and additional functions related to setting up and managing a conference call. CCC node 601 may be implemented as a single physical device performing the requisite functions. CCC node 601 may, instead, be distributed over a plurality of physical devices that may be located in disparate locations, where the physical implementations of connections 602*a*, 603*a*, 604*a*, and 605*a* comprise multiple strands, as needed for the respective conferencing nodes to connect with the disparate physical devices of CCC node 601.

Conferencing nodes 602, 603, and 604 are enhanced conferencing nodes, allowing for a plurality of co-located participants and a display of participants at other locations. Node 605 is a conventional conferencing node, whose participants are not individually identified and participants at remote locations are not displayed. A conventional conferencing node can be, for example, a regular, VOIP (voice over IP) telephone, a POTS (plain old telephone service) telephone, a cellular telephone, or other telephonic device that does not provide the enhanced features of an enhanced conferencing node. Thus, for example, participants at conferencing node 602 see identification of speaking participants at enhanced conferencing nodes 603 and 604. However, when participants at conventional conferencing node 605 speak, no speaker identification will be displayed at the enhanced conferencing nodes. Instead, an identification of conventional conferencing node 605 itself may be displayed.

CCC node 601 comprises interconnected network bridge 606 and application server 607. One or more of these components of CCC node 601 are connected to one or more of communication paths 602*a*, 603*a*, 604*a*, and 605*a*. One or more of the components of CCC node 601 may be connected to other and/or additional components.

Application server 607 manages network bridge 606 and may function as a third-party conference-call manager. Application server 607 may handle SIP messages from and to conference nodes 602, 603, 604, and/or 605 to set up a conference call that uses network bridge 606. Application server 607 may configure RTP handling and mixing functions in network bridge 606 for the conference call. During an ongoing conference call, network bridge 606 receives and processes RTP packets from the conferencing nodes. Network bridge 606 functions as a specialized mixer for the conferencing nodes by combining, as appropriate, RTP packets from any two or more conferencing nodes for transmission to the other nodes. The combining includes combining of participant ID information in the CSRC fields of received RTP packets into the CSRC field of transmitted RTP packets. The specialized mixer functions of network bridge 606 are somewhat similar to the cascading mixer of RFC 3550, but different in that network bridge 606, unlike the cascading mixer, does not use SSRC fields in mixing content from enhanced conferencing nodes, even for unmixed content from enhanced nodes with one contributing participant.

If, for example, participants at each conferencing node are speaking simultaneously, then network bridge 606 would send to, for example, conferencing node 602 an RTP packet combining the multimedia content from the corresponding RTP packets from conferencing nodes 603, 604, and 605. That sent RTP packet would further include the participant ID information from the corresponding RTP packets of conferencing nodes 603 and 604. That sent RTP packet may also include some identifier, as discussed above, for conferencing node 605. Similar processing occurs for RTP packets sent to conferencing nodes 603 and 604. RTP packets sent to conferencing node 605 may also include relevant participant ID information in the CSRC field. Alternatively, the CSRC fields in RTP packets sent to conferencing node 605 may be left empty or they may list the contributing SSRC identifiers for the contributing conferencing nodes.

Embodiments of the invention have been described where conference calls having three or more nodes use a conference-call control (CCC) system. In alternative embodiments, the functions of the CCC system are performed by one of the conferencing nodes participating in the conference call, rather than by a third party node that is not a node of the conference call.

Embodiments of the invention have been described where conferencing nodes are either conventional or enhanced conferencing nodes. In alternative embodiments, one or more conferencing nodes are intermediate-featured conferencing nodes that have more features than conventional conferencing nodes but fewer features than enhanced conferencing nodes. For example, in one implementation, an intermediate-featured conferencing node displays the identified participants from remote conferencing nodes but does not itself individually identify local participants in SIP or RTP packets it transmits.

In another implementation, an intermediate-featured conferencing node individually identifies local participants in SIP and RTP packets it transmits, but does not display the identified participants from remote conferencing nodes. It should be noted that a conferencing node may be designed to be an intermediate-featured conferencing node or it may operate as one due to problems in an enhanced conferencing node.

Embodiments of the invention have been described as using BLUETOOTH® wireless technology. Wireless embodiments of the invention are not limited to BLUETOOTH® technology. Alternative wireless embodiments utilize wireless technologies other than BLUETOOTH®. It should be noted that both BLUETOOTH® and alternative wireless technologies may allow automatic proximity-based determination that an identifiable participant has joined or left an ongoing conference based on the proximity to the telecommunication device of the microphone corresponding to the identifiable participant.

Embodiments of the invention have been described where a SIP conference call is set up in accordance with RFC 4579, where the conference call is controlled by a focus entity. In an alternative embodiment, a SIP conference call is set up using a system other than that described in RFC 4579. In one exemplary implementation, a conference call is established without using a focus, where information to set up the conference call is exchanged through basic SIP message parameters. In another sample implementation, a conference call is established where multiple foci are used.

Embodiments of the invention have been described where information about conference-call participants at a conferencing node is transmitted using SIP NOTIFY messages. The invention is not limited to this transmission mechanism. In an alternative embodiment, the information is transmitted using another type of SIP message. In yet another alternative embodiment, the information is transmitted using RTP packets. In yet another alternative embodiment, the information is transmitted via a transmission system not including either SIP messages or RTP packets. For example, the information can be transmitted via another Internet-compatible messaging protocol, such as, e.g., Extensible Messaging and Presence Protocol (XMPP), or Simple Mail Transfer Protocol (SMTP).

Embodiments of the invention have been described using the SIP and RTP protocols. The invention is not limited to these protocols. Alternative embodiments of the invention may use other schemes, which might or might not include alternative protocols, for setting up, controlling, and/or transmitting bearer traffic for conference calls.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

Exemplary embodiments have been described with data flows between entities in particular directions. Such data flows do not preclude data flows in the reverse direction on the same path or on alternative paths that have not been shown or described. Paths that have been drawn as bidirectional do not have to be used to pass data in both directions.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

I claim:

1. A telecommunication device comprising:
a networking port adapted to connect the telecommunication device with one or more other telecommunication devices to establish a conference call including the telecommunication device and the one or more other telecommunication devices;
two or more microphone ports adapted to connect the telecommunication device with two or more microphones, wherein each microphone:
is co-located with the telecommunication device;
is individually identifiable by the telecommunication device;
is associated with participant identifiable by a participant ID and co-located with the microphone; and
is adapted to transmit audio content generated by the associated participant to the telecommunication device; and
a processor adapted to:
generate data packets encoding the audio content generated by the participants associated with the two or more microphones, wherein each data packet:
identifies at least one participant contributing to the audio content encoded in the data packet; and
comprises the participant IDs of one or more participants in order to enable identification of the one or more participants; and
transmit the data packets via the networking port for the conference call.

2. The telecommunication device of claim 1, wherein, prior to generating data packets that identify the one or more participants contributing to the audio content, the processor transmits at least one message to the one or more other telecommunication devices, the at least one message comprising the participant IDs for the one or more participants.

3. The telecommunication device of claim 2, wherein the at least one message further comprises identifying information for the one or more participants.

4. The telecommunication device of claim 3, wherein the identifying information for the one or more participants includes names of the one or more participants.

5. The telecommunication device of claim 1, wherein the data packets encoding the audio content generated by the participants are compatible with Real-time Transport Protocol (RTP).

6. The telecommunication device of claim 5, wherein each RTP-compatible data packet encoding the audio content generated by a participant further comprises identifying information, including a name, for the participant.

7. The telecommunication device of claim 5, wherein:
each RTP-compatible data packet comprises a contributing source (CSRC) field; and each data packet comprises the participant IDs of the one or more participants in the CSRC field of the data packet.

8. The telecommunication device of claim 1, wherein:
the networking port connects the telecommunication device to a second and a third telecommunication device to establish the conference call; and
the processor transmits the data packets to both the second and third telecommunication devices.

9. The telecommunication device of claim 1, wherein:
the networking port connects the telecommunication device to a second and a third telecommunication device to establish the conference call; and
the processor transmits the data packets to a conference-call control (CCC) system for processing and transmission of processed data packets to the second and the third telecommunication devices.

10. The telecommunication device of claim 1, wherein the processor is further adapted to:
determine that an identifiable participant has left or joined an ongoing conference call; and
transmit at least one message to the one or more other telecommunication devices, the at least one message indicating that the identifiable participant has left or joined the ongoing conference.

11. The telecommunication device of claim 10, wherein:
the two or more microphone ports are connected wirelessly to the two or more microphones; and
the processor is adapted to automatically determine that the identifiable participant has joined or left the ongoing conference call based on proximity to the telecommunication device of the microphone corresponding to the identifiable participant.

12. The telecommunication device of claim 1, wherein the two or more microphone ports are connected wirelessly to the two or more microphones.

13. The telecommunication device of claim 12, wherein:
each of the two or more microphone ports is adapted to dynamically connect to and disconnect from a corresponding microphone based on proximity of the corresponding microphone to the telecommunication device.

14. The telecommunication device of claim 12, wherein:
the telecommunication device and the two or more microphones are compatible with BLUETOOTH® technology; and
each microphone has a unique BLUETOOTH® ID that is associated with the associated participant at least for the duration of the participant's participation in the conference call.

15. The telecommunication device of claim 1, wherein at least one of the two or more microphones ports is connected via a conductive wire to at least one of the two or more microphones.

16. A telecommunication device comprising:
a networking port adapted to connect the telecommunication device with one or more other telecommunication devices to establish a conference call including the telecommunication device and the one or more other telecommunication devices;
two or more microphone ports adapted to connect the telecommunication device with two or more microphones, wherein each microphone:
is co-located with the telecommunication device;
is individually identifiable by the telecommunication device;
is associated with an identifiable participant co-located with the microphone; and
is adapted to transmit audio content generated by the associated participant to the telecommunication device; and
a processor adapted to:
generate data packets encoding the audio content generated by the participants associated with the two or more microphones; and
transmit the data packets via the networking port for the conference call, wherein:
each data packet identifies at least one participant contributing to the audio content encoded in the data packet;
the processor is adapted to process data packets from the one or more other telecommunication devices; and
at least one data packet from one of the one or more other telecommunication devices comprises:
audio content generated by one or more identifiable participants, each identifiable participant associated with a corresponding microphone connected to the one of the one or more other telecommunication devices; and
identification of each of the one or more identifiable participants.

17. A telecommunication device comprising:
a networking port adapted to connect the telecommunication device with one or more other telecommunication devices to establish a conference call including the telecommunication device and the one or more other telecommunication devices;
two or more microphone ports adapted to connect the telecommunication device with two or more microphones, wherein each microphone:
is co-located with the telecommunication device;
is individually identifiable by the telecommunication device;
is associated with an identifiable participant co-located with the microphone; and
is adapted to transmit audio content generated by the associated participant to the telecommunication device; and
a processor adapted to:
generate data packets encoding the audio content generated by the participants associated with the two or more microphones; and
transmit the data packets via the networking port for the conference call, wherein:
each data packet identifies at least one participant contributing to the audio content encoded in the data packet;
the two or more microphone ports are connected wirelessly to the two or more microphones;
the telecommunication device and the two or more microphones are compatible with BLUETOOTH® technology; and
each microphone has a unique BLUETOOTH® ID that is associated with the associated participant at least for the duration of the participant's participation in the conference call.

18. A telecommunication device comprising:
a networking port adapted to connect the telecommunication device with one or more other telecommunication devices to establish a conference call including the telecommunication device and the one or more other telecommunication devices;

two or more microphone ports adapted to connect the telecommunication device with two or more microphones, wherein each microphone:
  is co-located with the telecommunication device;
  is individually identifiable by the telecommunication device;
  is associated with an identifiable participant co-located with the microphone; and
  is adapted to transmit audio content generated by the associated participant to the telecommunication device; and
a processor adapted to:
  generate data packets encoding the audio content generated by the participants associated with the two or more microphones; and
  transmit the data packets via the networking port for the conference call, wherein:
    each data packet identifies at least one participant contributing to the audio content encoded in the data packet; and
    the telecommunication device further comprises a radio-frequency ID (RFID) reader adapted to read information off a proximately presented RFID tag of an identifiable participant in order to associate one of the two or more microphones with the identifiable participant.

19. The telecommunication device of claim 18, wherein the telecommunication device is further adapted to:
  cradle at least one of the two or more microphones; and
  in response to the proximate presentation of an RFID tag of an identifiable participant, release the cradled one of the two or more microphones to the identifiable participant.

20. A method for a telecommunication device, the method comprising:
  connecting the telecommunication device with one or more other telecommunication devices to establish a conference call including the telecommunication device and the one or more other telecommunication devices;
  connecting the telecommunication device with two or more microphones, wherein each microphone:
    is co-located with the telecommunication device;
    is individually identifiable by the telecommunication device;
    is associated with a participant identifiable by a participant ID; and
    is adapted to transmit audio content generated by the associated participant to the telecommunication device;
  generating data packets encoding the audio content generated by the participants associated with the two or more microphones, wherein:
    each data packet identifies at least one participant contributing to the audio content encoded in the data packet; and
    each data packet comprises the participant IDs of one or more participants in order to enable identification of the one or more participants; and
  transmitting the data packets for the conference call.

* * * * *